UNITED STATES PATENT OFFICE.

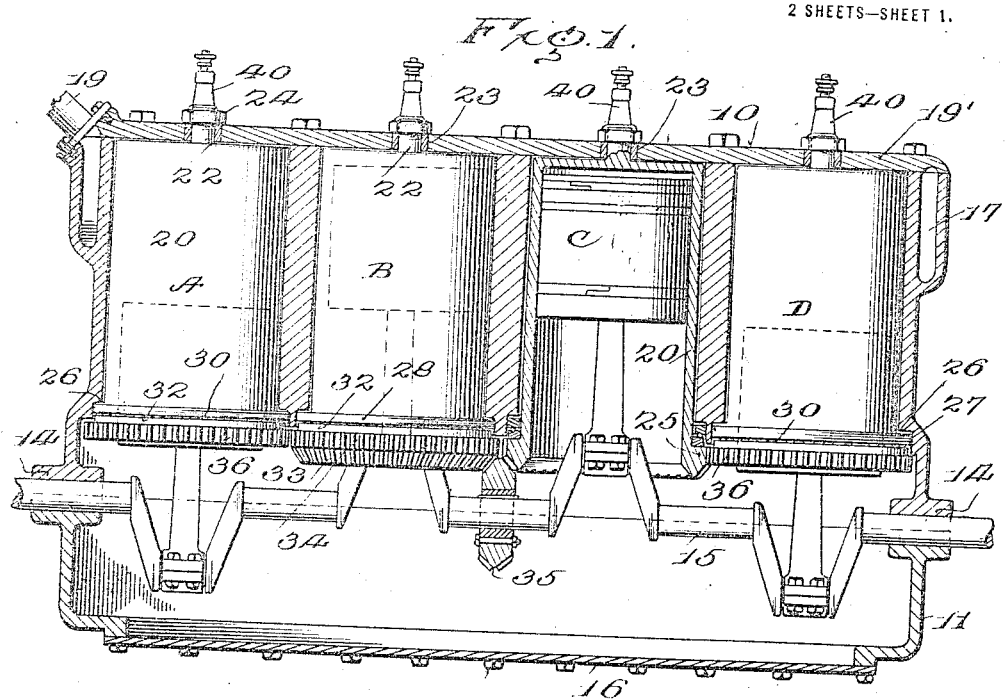

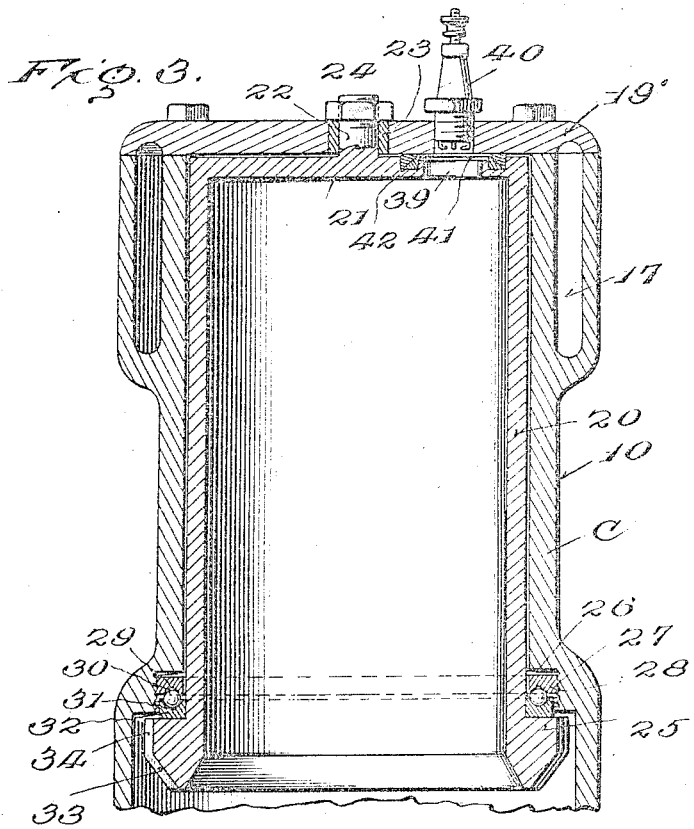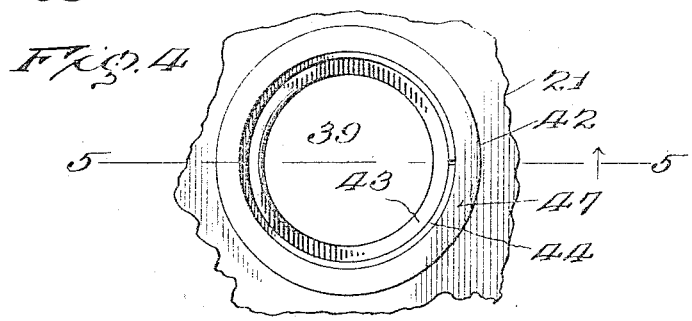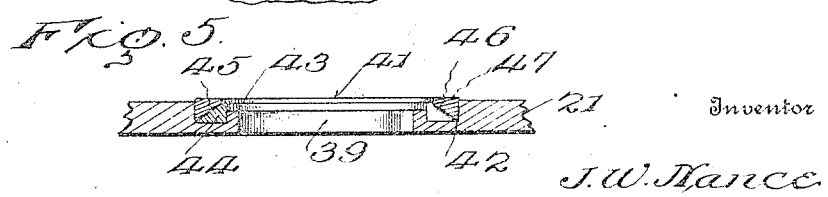

JAMES W. NANCE, OF FILER, IDAHO, ASSIGNOR TO FRANKLIN GAS TURBINE COMPANY, OF PHOENIX, ARIZONA.

ROTARY-VALVE GAS-ENGINE.

1,267,787.    Specification of Letters Patent.    Patented May 28, 1918.

Application filed February 27, 1917. Serial No. 151,324.

*To all whom it may concern:*

Be it known that I, JAMES W. NANCE, a citizen of the United States, residing at Filer, in the county of Twin Falls and State of Idaho, have invented certain new and useful Improvements in Rotary-Valve Gas-Engines, of which the following is a specification.

My invention relates to new and useful improvements in internal combustion engines and more particularly to engines of the rotary sleeve valve type, the primary object of my invention being the provision of an engine having gas tight cylinders which will have fewer movable parts and, consequently, less friction and which may be manufactured at low cost.

A still further object of my invention is to so arrange and construct the moving parts as to do away, to a great extent, with vibration and consequent wear and to render the engine practically noiseless, except for the exhaust which, of course, may be quieted by employment of a suitable muffler.

Another object of my invention consists in constructing an engine in which the rotating sleeve valve has a closed head which engages against the inner face of the cylinder head and which is formed with a single port serving both as an intake and an exhaust port and through which the firing also occurs from a spark plug mounted in the cylinder head in position to be exposed through the port at the proper time.

In this connection, a still further object of my invention consists in the provision of a novel and efficient form of packing ring about the port of the sleeve valve to prevent escape of gases during operation of the engine.

Another object which I have in view is the provision of novel supporting bearings for the revolving sleeve valve which are adjustable and which will support and hold the valve with its walls spaced from the walls of the cylinder so that a sufficient film of oil may be constantly maintained and circulated between the bearing surfaces to effectively oil the parts and prevent wear.

Another object which I have in view is the arrangement of a novel form of drive mechanism between the crank shaft of the engine and the sleeve valves which is simple, economical and durable.

With these and other objects in view, my invention will be more full described, illustrated in the accompanying drawings, and then specifically pointed out in the claims which are attached to and form a part of this application.

In the drawings:

Figure 1 is a central, longitudinal sectional view of a four-cylinder engine constructed in accordance with my invention, one of the sleeve valves being shown in section and the remainder in elevation;

Fig. 2 is a top plan view of the engine shown in Fig. 1, the sleeve valve ports being indicated in dotted lines to illustrate the operation of the engine;

Fig. 3 is a transverse sectional view taken on the line 3—3 of Fig. 2, showing the manner in which an explosive charge in a cylinder is fired;

Fig. 4 is a fragmentary plan view of the head of a sleeve valve, showing the packing ring in place;

Fig. 5 is a sectional view taken on the line 5—5 of Fig. 4.

Corresponding and like parts are referred to in the following description and indicated in all the views of the drawings by the same reference characters.

In order to insure a clear and exact understanding of my invention and its manner of operation, I have illustrated it as embodied in a four-cylinder, four-cycle internal combustion engine, although it will be readily apparent that an engine of one, two, four or six or more cylinders may be constructed along the same lines. The engine body includes an upper casting 10 and crank case 11, the two having mating flanges 12 apertured to receive clamping bolts 13 and the abutting edges of the two being formed at their ends with bearings 14 to journal the usual crank shaft 15. The crank case 11 is preferably formed with a removable bottom 16 to permit access to the various wrist pin and connecting rod bearings. The upper casting comprises the cylinders of the engine which are cast *en bloc* and which, about their upper ends, are provided with a water jacketing 17 having the inlet pipe 18 and outlet pipe 19. For the sake of convenience, the cylinders are designated by the letters A, B, C and D. The cylinder heads are formed by a single casting 19' which is secured by bolts or other suitable fastening means. Mounted in each cylinder is a sleeve valve 20 which is free for rotation and which is provided with a closed head 21 at one end formed centrally with an upwardly directed stud or trunnion 22 which projects through the head of the cylinder proper, being journaled in a bronze bushing 23 fitted in the cylinder head. This stud is externally threaded to receive a nut 24 which holds the sleeve valve in the top of the cylinder. The sleeve valve, at its lower end, projects slightly into the crank case and is thickened to provide a peripheral flange 25. The lower end of the cylinder is enlarged to provide an annular chamber 26 immediately above this flange and the peripheral wall of this chamber is threaded, as shown at 27. Adjustable bearing rings 28 are threaded in each of the chambers 26 and the lower faces of these rings are provided with annular grooves 29 to form a race for ball bearings 30 which also seat in corresponding grooves 31 formed in bearing rings 32 which rest upon the flanges 25 of the sleeve valves. Obviously, by proper adjustment of the bearing ring 28 and the nut 24, each sleeve valve may be supported and centered in its cylinder so as to provide a sufficient space between its walls and the walls of the cylinder for the maintenance of an oil film for lubricating purposes. The flanged lower ends of the sleeve valves of the cylinders B and C are formed with compound gears consisting of beveled gear portions 33 and spur gear portions 34, the former gear portions meshing with a double beveled pinion 35 keyed or otherwise fixed to the center of the crank shaft 15. The flanged ends of the sleeve valves in the cylinders A and B are formed with spur gears 36 which mesh with the spur gear portions 34 of the sleeve valves of the adjacent cylinders B and C. It will, therefore, be clear that, assuming the direction of rotation of the crank shaft to be that indicated by the arrow in Fig. 1, the sleeve valves will be turned in the direction indicated by the arrows in Fig. 2. The gears of the sleeve valves and the beveled pinion 35 are so proportioned that the sleeve valves will be turned at one-half the speed of the crank shaft.

Each cylinder head is formed with an intake port 37 and an exhaust port 38, the former being preferably circular and the latter elongated circumferentially slightly, as shown. Each sleeve valve is formed in its head with a single port 39 preferably equal in size to the intake port of its cylinder, all of the ports, both of the cylinder heads and sleeve valves being equally spaced from the axial centers of the cylinders so that, in each instance, the port of the sleeve valve will successively register with the cylinder ports during rotation of the sleeve valve. The intake and exhaust ports of each cylinder are preferably spaced from each other a distance substantially equal to the diameter of the port of the sleeve valve so that as soon as the sleeve valve port moves out of registration with the exhaust port, it will begin to register with the intake port. Each cylinder head is formed also with a tapped opening to receive a spark plug 40, these openings being disposed at the same distance from the axial center of the cylinder head as the inlet and exhaust ports and at an equal distance from each of the inlet and exhaust ports and at the opposite side of the cylinder head so that the firing through the port 39 of the sleeve valve will occur at the proper time. The spark plugs are, of course, so proportioned that their points will not project below the inner face of the cylinder head and, as a result, they will not interfere with the movement of the sleeve valve.

As will be apparent from the foregoing description, the sleeve valves in themselves constitute the firing chambers of the engine and to prevent leakage of gases from the sleeve valves during running of the engine, I provide compound packing rings indicated as a whole by the numeral 41 which are seated in the outer face of the sleeve valves and which engage the inner faces of the cylinder heads. The head of each sleeve valve is formed with an annular channel 42 in its outer face concentrically disposed with respect to the port 39 and preferably rectangular in cross section, as best shown in Fig. 5, and that portion of the material forming the sleeve valve between this channel and the port, is preferably cut-away to a slight extent in order to space its upper edge 43 from the adjacent face of the cylinder head, for a reason which will be soon explained.

Each compound packing ring 41 includes an inner lower ring 44 which is preferably formed of resilient metal and split in order that it may expand under internal pressure. The upper face of this ring is beveled outwardly, as shown at 45, to seat the inwardly beveled lower face 46 of the upper outer ring 47 which need not be of resilient metal and need not be split and which projects somewhat above the upper face of the head of the sleeve valve to engage the lower face of the cylinder head. It should be noted that the inner lower packing ring 42 projects at its upper edge above the edge 43 about the port so that whenever gases are compressed in the sleeve valve, pressure will be exerted outwardly against the split ring 42, causing it to expand and thus act through the inclination of its upper face and inclination of the lower face of the upper ring 47 to raise the upper ring and force it into firm engagement with the cylinder head. Because of this construction, the packing rings need not fit with any extreme tightness as their component parts will be expanded at times of pressure in the sleeve valve to cause tight fitting. The upper ring is, therefore, self-grinding and the packing ring as a whole automatically adapts itself to take up wear.

The operation of the above described engine will be readily understood by reference to Figs. 1 and 2 of the drawings, particular attention being paid to the direction of movement of the parts, as indicated by the arrows. As there shown, cylinder A is at the beginning of the exhaust stroke, cylinder B is at the beginning of the intake stroke, cylinder C is at the beginning of the firing stroke and cylinder D is at the beginning of the compression stroke. Both the drawing in of the explosive gases and the exhausting of burnt gases, as well as the firing of the compressed gases, takes place through the single port 39 of the sleeve valve and any escape of gas is, at all times, prevented by the compound packing ring. Inasmuch as the casting 19′ may be readily removed, it will be clear that the packing rings may be replaced as they become worn, without any taking down of the engine as a whole.

Although I have illustrated and described my invention in all its details of construction, it will of course be understood that I reserve the right to make any changes, within the scope of the appended claims, without in the slightest degree departing from the spirit of my invention.

Having thus described the invention, what is claimed as new is:

1. In an internal combustion engine, a cylinder having a head formed with spaced inlet and outlet ports and with a spark plug receiving opening spaced from the ports, the ports and opening being equally spaced from the center of the cylinder head, a sleeve valve rotatably mounted in the cylinder and having a head formed with a port adapted to successively register with the inlet port, spark plug opening and exhaust port of the cylinder head, and a packing ring surrounding the port in the valve head and engaging the cylinder head, said packing ring including a split resilient ring having its upper face beveled, seated in a channel formed in the valve head and communicating with the port, and a second ring having its lower face beveled engaging upon the first whereby it will be forced toward the cylinder head by radial expansion of the first ring, due to internal pressure from the port.

2. In an internal combustion engine, a cylinder having a port, a movable valve member having a port adapted in a certain position to register with the port of the cylinder, said member in that face adjacent the cylinder being formed with an annular channel encircling its port and having that portion between the channel and port partially cut-away to establish communication between the port and channel, and means disposed in the channel and, consequently, subjected to any pressure of gases against the valve member, said means being such that such pressure will expand it into close engagement with the cylinder.

3. In an internal combustion engine, a cylinder having a port, a movable valve member having a port adapted in one position of the member to register with the cylinder port, such member in that face adjacent the cylinder being formed with an annular channel surrounding the port and having that portion between the channel and port partially cut-away to establish communication therebetween, a split resilient ring seated in the channel with its upper face beveled downwardly and outwardly and its inner face subject to any pressure of gases against the valve member, and a second ring seated on the first with its lower face beveled upwardly and inwardly whereby radial expansion of the split ring will force the second ring into close engagement with the cylinder.

4. In an internal combustion engine, a cylinder having a cylinder head formed centrally with an opening, the opposite end of the cylinder being counterbored and internally threaded, a sleeve valve mounted in the cylinder and having a trunnion extending through the opening in the cylinder head, a bushing surrounding the trunnion and seating in the opening, a bearing ring threaded in the counterbored end of the cylinder, a second ring mounted in the counterbored end of the cylinder, ball bearings interposed between the rings, and a flange formed on the lower end of the sleeve valve and engaging the second ring.

5. In an internal combustion engine, a cylinder having a cylinder head formed with a central opening, a bushing in the opening, a sleeve valve rotatably mounted in the cylinder and having a head engaging the cylinder head, a trunnion carried by the head of the valve and extending through the opening of the cylinder head, an annular flange upon the lower end of the sleeve valve, the cylinder at its lower end being counterbored to provide with the sleeve valve and flange an annular chamber above the flange, and a bearing adjustably mounted in the chamber.

6. In an internal combustion engine, a cylinder having a cylinder head formed with a central opening, a bushing in the opening, a sleeve valve rotatably mounted in the cylinder and having a head engaging the cylinder head, a trunnion carried by the head of the valve and extending through the opening of the cylinder head, an annular flange upon the lower end of the sleeve valve, the cylinder at its lower end being counterbored to provide with the sleeve valve and flange an annular chamber, a bearing ring supported by the flange and within the chamber, a second bearing ring within the chamber having adjustable threaded engagement with the outer peripheral wall of the chamber; anti-friction bearings disposed between the rings, and means upon the outer end of the trunnion for supporting the sleeve valve.

In testimony whereof I affix my signature.

JAMES W. NANCE. [L. S.]